United States Patent

Conti et al.

[11] Patent Number: 6,077,614
[45] Date of Patent: Jun. 20, 2000

[54] MODIFIED MELAMINE RESINS AND THEIR USE FOR PRODUCING POSTFORMABLE LAMINATES

[75] Inventors: Natale Conti, Varese, Italy; Friedl Heger, Linz, Austria

[73] Assignee: Agrolinz Melamin GmbH, Austria

[21] Appl. No.: 09/214,791

[22] PCT Filed: Jun. 25, 1997

[86] PCT No.: PCT/EP97/03321

§ 371 Date: Jan. 12, 1999

§ 102(e) Date: Jan. 12, 1999

[87] PCT Pub. No.: WO98/02474

PCT Pub. Date: Jan. 22, 1998

[30] Foreign Application Priority Data

Jul. 12, 1996 [AT] Austria ..................................... 1255/96

[51] Int. Cl.$^7$ ............................ B32B 27/42; C08G 12/02
[52] U.S. Cl. .......................... 428/524; 528/248; 528/252; 528/254; 528/256; 528/257; 528/266; 528/269; 428/526; 428/528; 428/530
[58] Field of Search ..................... 528/248, 252, 528/254, 256, 257, 266, 269; 428/524, 526, 528, 530

[56] References Cited

U.S. PATENT DOCUMENTS 3,488,310  1/1970  McCombs .
3,496,131  2/1970  Bornmann et al. .
4,145,371  3/1979  Tohyama et al. .

FOREIGN PATENT DOCUMENTS 0 007 705  2/1980  European Pat. Off. .
0 014 891  9/1980  European Pat. Off. .
0 052 212  5/1982  European Pat. Off. .
1464014  2/1977  United Kingdom .
WO96/20230  7/1996  WIPO .

*Primary Examiner*—Samuel A. Acquah
*Attorney, Agent, or Firm*—Wenderoth, Lind & Ponack, L.L.P.

[57] ABSTRACT

Modified melamine-formaldehyde resins are made of a condensate of formaldehyde, urea, melamine and modifying agents which contains: (a) a combination of 5 to 25 wt %, with respect to melamine, of dicyanodiamide and 8 to 30 wt %, with respect to melamine, of water-soluble polyalcohol with at least two hydroxyalkyl groups, and/or (b) 1.5 to 20 wt % amines having the formulas (Ia)

$$NR_4R_5—R_1—X \qquad (Ia)$$

and/or (Ib), $$NR_4R_5—R_2—Y—R_3—X \qquad (Ib)$$

in which $R_1$ and $R_3$ are the same or different and depending on the meaning of X stand for a linear, branched or cyclic $C_1$–$C_{12}$ alkyl or alkylene radical and $R_2$ stands for a linear, branched or cyclic $C_1$–$C_{12}$ alkylene radical; $R_4$ and $R_5$ can be the same or different and can stand for H or for a linear or branched $C_1$–$C_{12}$ alkyl radical; and X can stand for hydrogen, OH or $NR_4R_5$ and Y can stand for —O— or —NH—. The molar ratio of melamine to formaldehyde ranges from 1:1.2 to 1:5 and the molar ratio of melamine to urea ranges from 1:0.1 to 1:2.8. Also disclosed is the use of these resins to produce post-forming laminates.

10 Claims, No Drawings

MODIFIED MELAMINE RESINS AND THEIR USE FOR PRODUCING POSTFORMABLE LAMINATES

Melamine resin laminates based on impregnated papers have a wide field of use as decorative and protective surfaces because of their good fastness to light, abrasion resistance, resistance to chemicals, resistance to glowing heat and surface hardness.

Such laminates which are obtained by impregnation of carrier webs of textiles, paper or glass nonwovens with aqueous solutions of melamine-formaldehyde precondensates and subsequent drying and curing at temperatures above 100° C. are described, for example, in EP-A-0 077 067. EP-B1-0 268 809 describes melamine resin films which are obtained by coating papers with an at least 70% strength by weight aqueous solution of a melamine resin etherified by methyl.

The disadvantage of these known melamine resins and melamine resin laminates is, in particular, that they show a relatively high shrinkage during curing, that their mechanical properties, such as, for example, resistance to boiling water, are inadequate in many cases, and that above all they are very brittle and show no postforming properties.

It is known from U.S. Pat. No. 4,424,261 that the use of hydroxyalkylmelamines as modifying agents for melamine-formaldehyde resins leads to an improvement in the postforming properties. However, the disadvantage of these modifying agents is their instability, which means they are not easily available and furthermore can be handled only with difficulty, since they have a marked tendency to undergo self-crosslinking.

Other modifying agents, such as, for example, guanamines, which lead to postforming properties of the resins, are described in EP-A1-0 561 432. However, guanamines, especially those with aromatic nuclei, such as benzoguanamine, do not have an adequate resistance to light, which means that the modified resins yellow easily. Furthermore, the low solubility of the guanamines in the reaction medium has an adverse effect on the preparation process for the resins.

WO-A-9620 230 furthermore discloses resins consisting of the components formaldehyde melamine, dicyandiamide in an amount of 5 to 25% by weight based on the melamine and a polyalcohol such as trimethylolpropane in an amount of 8 to 30% by weight based on the melamine. Although these resins also show postforming properties and resistance to boiling water, the possibility of converting these resins into powder form by spray drying is not described.

EP-A-0 007 705 discloses resins which comprise melamine, formaldehyde and a hydroxymonoamine, part of the melamine being replaced by urea. Properties such as postforming, resistance to boiling water and suitability for spray drying are not described.

It was therefore necessary to discover a modifying agent for melamine resins which does not have the disadvantages of the modifying agents known to date and greatly improves the postforming properties of the melamine resins without reducing their resistance to boiling water and which leads to resins which can-be spray-dried. It has now been found, unexpectedly, that such melamine resins are obtained by using special modifying agents comprising a combination of certain polyalcohols and dicyandiamide or certain amines, and addition of urea.

The present invention accordingly relates to modified melamine-formaldehyde resins which comprise a condensate of formaldehyde, melamine, urea and modifying agent comprising a) a combination of 5 to 25% by weight, based on the melamine, of dicyandiamide and 8 to 30% by weight, based on the melamine, of polyalcohol of the formula $$R_1-(R_2OH)_3 \quad \text{Ia}$$

or $$HOR_4-R_3-R_5OH \quad \text{Ib}$$

in which, in the formula Ia, $R_1$ is a radical of the formula

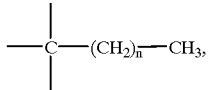

where n is 0 to 3, IIa
or a radical of the formula

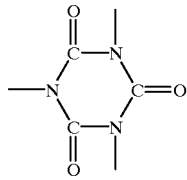

IIb $R_2$ is a linear or branched ($C_1$ to $C_4$)alkylene radical and, in the formula Ib, $R_3$ is a cycloalkylene radical having 6 C atoms or $R_3$, like $R_4$ and $R_5$ is a linear or branched ($C_1$ to $C_6$)alkylene radical, which can optionally be substituted by a further hydroxyl group, where $R_3$, $R_4$ and $R_5$ can be identical or different and/or b) amines of the formulae $$NR_4R_5-R_1-X \quad \text{IIIa}$$

and/or $$NR_4R_5-R_2-Y-R_3-X \quad \text{IIIb}$$

in which $R_1$ and $R_3$ can be identical or different and, depending on the meaning of X, are a linear or branched or cyclic $C_1$ to $C_{12}$-alkyl or alkylene radical and $R_2$ is a linear or branched or cyclic $C_1$ to $C_{12}$-alkylene radical, $R_4$ and $R_5$ can be identical or different and are H or a linear or branched $C_1$ to $C_{12}$-alkyl radical, and X can be hydrogen, OH or $NR_4R_5$ and Y can be —O— or —NH—,
the molar ratio of melamine to formaldehyde being 1:1.2 to 1:5 and that of melamine to urea being 1:0.1 to 1:2.8.

The melamine resins according to the invention are thus modified by a combination of dicyandiamide with polyalcohols, of the formula Ia or Ib, or by the specific amines of the formulae IIIa and/or IIIb.

Polyalcohols, of the formula Ia or Ib contain at least two hydroxyalkyl groups, and here are compounds in which the hydroxyalkyl groups are bonded to an aliphatic, cycloaliphatic or heterocyclic core structure. Aliphatic core structures are to be understood here as meaning linear or branched $C_1$ to $C_{10}$ alkylene groups, which can optionally be substituted by carbonyl, amino or ($C_1-C_6$)-alkoxy groups.

Possible cycloaliphatic core structures are $C_5$ to $C_8$ cycloalkylene groups, which can likewise optionally contain further substituents such as, for example, carbonyl groups, in addition to the hydroxyalkyl groups. The heterocylic core structure can contain 1 to 3 hetero atoms, such as N, O or S, in the ring, and optionally further substituents, such as, for example, carbonyl radicals. The alkyl part of the hydroxyalkyl groups here has 1 to 6 C atoms.

Preferred polyalcohols are those of the formula

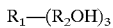 Ia or

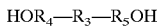 Ib in which, in the formula IIa [sic] a radical of the formula

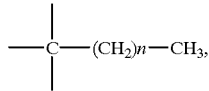 IIa where n is 0 to 3, is $R_1$
or a radical of the formula

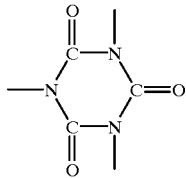 IIb $R_2$ is a linear or branched ($C_1$ to $C_4$)-alkylene radical.

In the formula Ib), $R_3$, $R_4$ and $R_5$ are a linear or branched ($C_1$ to $C_6$)-alkylene radical, which can optionally be substituted by a further hydroxyl group. $R_3$, $R_4$ and $R_5$ here can be identical or different. $R_3$ can furthermore also be a cycloalkylene radical having 6 C atoms.

Particularly preferred polyalcohols here are trimethylolpropane, trimethylolethane, trishydroxyethyl isocyanurate, neopentylglycol, 1,4-dimethylolcyclohexane, 4-methyl-2,4-pentanediol, 1,6-hexanediol, 3-methyl-1,3,5-pentanetriol and 2,2,4-trimethyl-1,3-pentanediol.

The polyalcohols can be added both as an individual compound and as a mixture of several polyalcohols. The amount of polyalcohol in the melamine resin according to the invention is about 8 to 30% by weight, based on the melamine employed. About 12 to 22% by weight of polyalcohols is preferably employed.

According to the invention, the polyalcohols are used in combination with dicyandiamide as modifying agents for melamine-formaldehyde resins. The amount of dicyandiamide here is about 5 to 25% by weight, based on the melamine employed, preferably about 8 to 18% by weight.

The melamine resins according to the invention can also be modified by amines of the formulae IIIa and/or IIIb, instead of the combination described above.

In the formulae IIIa and IIIb, $R_1$ and $R_3$ are, depending on the meaning of X, a $C_1$ to $C_{12}$-alkyl or alkylene radical, which can be linear, branched or cyclic. Examples of these are methyl, ethyl, n-propyl, i-propyl, n-butyl, sec-butyl, tert-butyl, hexyl, decyl, dodecyl, methylene, ethylene, n-propylene, i-propylene, n-butylene, sec-butylene, tert-butylene, hexylene, decylene, dodecylene, cyclohexyl or cyclodecyl. Cyclic radicals here can be optionally substituted by further alkyl groups. Linear, branched or cyclic $C_1$ to $C_6$-alkyl or alkylene radicals are preferred.

$R_2$ in the formula Ib is a linear, branched or cyclic $C_1$–$C_{12}$-alkylene radical as defined above. Linear, branched or cyclic $C_1$–$C_6$-alkylene radicals are preferred. $R_4$ and $R_5$ in the formulae Ia and Ib can be identical or different and are H or a linear or branched $C_1$–$C_{12}$-alkyl radical as defined above. $R_4$ and $R_5$ are preferably hydrogen.

X in the formulae IIIa and IIIb can be hydrogen or a hydroxyl or an amine radical. Amine radicals here are to be understood as meaning both primary, secondary and also tertiary amine radicals of the formula —$NR_4R_5$, in which $R_4$ and $R_5$ are as defined above.

Y in the formula Ib [sic] is —O— or —NH—.

Examples of amines of the formulae Ia and Ib [sic] are ethylamine, butylamine, hexylamine, methoxypropylamine, ethoxypropylamine, diglycolamine, ethylenediamine, propylenediamine, hexylenediamine or isophoronediamine. Amines such as, for example, ethoxypropylamine, diglycolamine or isophoronediamine are preferred.

The amines of the formulae IIIa and IIIb can be used both as an individual compound and as a mixture of several amines. The amount of amine in the melamine-formaldehyde resin according to the invention is about 1.5 to 20% by weight, based on the melamine. About 2.5 to 15% by weight of amine is preferably employed.

If appropriate, a mixture of the modifying agents a) and b) can also be employed.

However, the combination of polyalcohol and dicyandiamide is preferably employed as the modifying agent.

The molar ratio of melamine to formaldehdye in the resins to be modifed is 1:1.2 to 1:5. Melamine and formaldehyde are preferably employed in a molar ratio of 1:1.4 to 1:2.8.

Urea is furthermore cocondensed in the resins according to the invention. The molar ratio of melamine to urea here is 1:0.1 to 1:2.8, preferably between 1:0.15 and 1:1.

The melamine-formaldehyde resins modified according to the invention are obtained by subjecting melamine and urea to a condensation reaction with formaldehyde in a known manner in aqueous solution and admixing the modifying agent in the abovementioned amount before or during the condensation. If combination a) is used, the polyalcohol and dicyandiamide components can be added here both as a mixture and as individual components. For preparation of the resins according to the invention, however, it is also possible to employ a finished mixture comprising melamine, urea, formaldehyde and amine and/or dicyandiamide and polyalcohol.

The present invention furthermore accordingly relates to the use of a mixture of formaldehyde, urea, melamine and
a) 5 to 25% by weight, based on the melamine, of dicyandiamide and 8 to 30% by weight, based on the melamine, of polyalcohol of the formula

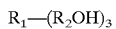 Ia or

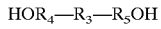 Ib in which, in the formula Ia, $R_1$ is a radical of the formula

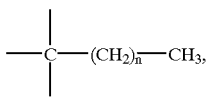

where n is 0 to 3, IIa
or a radical of the formula

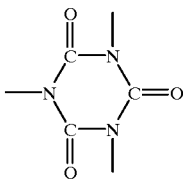

IIb and $R_2$ is a linear or branched ($C_1$ to $C_4$)alkylene radical and, in the formula Ib, $R_3$ is a cycloalkylene radical having 6 C atoms or $R_3$, like $R_4$ and $R_5$ is a linear or branched ($C_1$ to $C_6$)alkylene radical, which can optionally be substituted by a further hydroxyl group, where $R_3$, $R_4$ and $R_5$ can be identical or different or b) 1.5 to 20% by weight, based on the melamine, of amines of the formula IIIa and or [sic] IIIb, which comprises melamine and formaldehyde in a molar ratio of 1:1.2 to 1:5 and melamine and urea in a molar ratio of 1:0.1 to 1:2.8, for the preparation of modified melamine-formaldehyde resins.

However, a highly modified melamine-formaldehyde resins [sic] can also be prepared in a preliminary stage by addition of 40 to 60% by weight of amine, based on the melamine. This highly modified melamine-formaldehyde resins [sic] can then be employed as a modifying agent for the preparation of the melamine-formaldehyde resin (MF resin) according to the invention. The weight ratio of modifying agent to MF resin here is 1:2 to 1:6, preferably 1:3.

The present invention furthermore accordingly relates to the use of a melamine-formaldehyde resin which comprises 40 to 60% by weight of amine of the formula IIIa and/or IIIb, based on the melamine, and melamine and formaldehyde in a molar ratio of 1:1.2 to 1:5 and melamine and urea in a molar ratio of 1:0.1 to 1:2.8, for the preparation of modified melamine-formaldehyde resins.

To accelerate the reaction in the modification of the melamine resins with the combination according to the invention, customary catalysts, such as, for example, p-toluenesulfonic acid, can be added in amounts of about 0.1 to 1% by weight, based on the total amount of the melamine resin.

Hydrolyzable salts of weak to strong carboxylic acids, sulfonic acids or mineral acids, for example diethanolamine acetate, morpholine, diethanolamine, ethanolamine hydrochloride, ethylenediamine acetate, ammonium thiocyanate, ammonium lactate, ethylenediamine phosphate or the dimethylethanolamine salt of p-toluenesulfonic acid, can furthermore also be added to the resins in order to accelerate the curing, without the elasticity of the resins being impaired as a result.

If appropriate, additional modifying agents, such as ε-caprolactam or aromatic sulfonic acid amides, such as p-toluenesulfonamides, can also be added during the preparation of the resins in an amount of 0 to 40% by weight, preferably 0–20% by weight, based on the melamine.

The condensation of the resins is as a rule continued up to a limited water-dilutability.

If desired, the resins thus prepared and the highly modified resins used as modifying agents can be converted into powder form by spray drying. The resins are preferably dried here to a residual moisture content of 1–1.5%, for example by means a centrifugal or an air drier. The resins dried in this way must then be disolved in water before their use.

On the basis of their outstanding properties, such as absence of phenol and therefore environment-friendliness, and no waste gas problems during the impregnation, the melamine-formaldehyde resins modified according to the invention are suitable for a large number of uses.

The melamine-formaldehyde resins modified according to the invention are particularly suitable for the production of decorative or protective surfaces having excellent postforming properties. The precursors (films) of the decorative or protective surfaces are produced by impregnation of webs of paper or fabric. Paper webs are preferably made of decorative paper or kraft paper. Fabric webs here preferably comprise a nonwoven, woven fabric or fiberwoven fabric of glass, carbon, ceramic or aramid fibers. Depending on the requirements regarding the properties of the laminates thus produced, mixtures of different fibers, unidirectional continuous fibers or several layers of the same or different reinforcing webs can also be employed.

The impregnation of these webs with the melamine-formaldehyde resins modified according to the invention is carried out, for example, by dipping or spraying and subsequent squeezing off or knife-coating to give the desired resin content of the films. The resin content depends above all on the properties required for the films or the laminates and on the nature of the fiber reinforcement, and is usually 30 to 60% by weight, based on the carrier material impregnated with resin.

The impregnation is usually carried out at temperatures of about 20 to 60° C., depending on the viscosity and consistency of the melamine resin. To obtain a film which can be stored, the films are dried at about 80 to 160° C. to a particular residual moisture content after the impregnation, the readily liquid impregnating resin reacting more or less with partial curing and crosslinking, depending on the temperature and the duration of the heat treatment.

In this state, the film can be stored and transported at about room temperature. Several layers of impregnated kraft and decorative papers are then pressed at a temperature of 120 to 180° C. under a pressure of 25 to 100 bar to give the laminate. On the basis of the excellent postforming properties, the laminate can be shaped to the desired molding at temperatures of 80 to 180° C. under pressure, with further crosslinking of the melamine resin.

The laminates obtained from the resins modified according to the invention are distinguished above all by a high resistance to boiling water, and by an improved elasticity of their surface, so that low bending radii can be achieved with cracking being avoided.

EXAMPLE 1

126 parts (1 mol) of melamine, 146.7 parts (1.76 mol) of 36% strength formaldehyde solution, 20 parts (0.15 mol) of trimethylolpropane, 14.7 parts (0.175 mol) of dicyandiamide, 3.6 parts (0.032 mol) of caprolactam, 10 parts (0.17 mol) of urea and 70.6 parts of deionized water were subjected to a condensation reaction, in a tank with a stirrer and reflux condenser, at 90° C. and a pH of 9.3–10 (maintained with sodium hydroxide) until a water-dilutability of about 1.2 at 20° C. (1.0 part by volume of resin: 1.2 parts by volume of H₂O) was reached.

EXAMPLE 2

Analogously to Example 1, 126 parts of melamine (1 mol), 111 parts of Formurea 80 (concentrated aqueous solution of formaldehyde (2.11 mol) and urea (0.426 mol) produced by Agrolinz Melamin Italia), 21.4 parts (0.16 mol) of trimethylolpropane, 15.9 parts (0.19 mol) of dicyandiamide, 4 parts (0.035 mol) of caprolactam and 163.2 parts of deionized water were subjected to a condensation reaction.

EXAMPLE 3–5

Further modified resins were prepared analogously to Example 1. The proportion of melamine was in each case 126 parts.

The proportion of formaldehyde (FA), urea (U), H₂O and modifying agent and the nature thereof can be seen from Table 1.

TABLE 1

| Example | FA (mol) | U (mol) | DCDA (mol) | TMP (mol) | CL (mol) | DGA (mol) | H₂O parts |
|---|---|---|---|---|---|---|---|
| 3 | 2.35 | 0.64 | 0.20 | 0.17 | 0.036 | — | 176.6 |
| 4 | 2.56 | 0.87 | 0.11 | 0.08 | — | 0.064 | 175.8 |
| 5 | 3.72 | 1.73 | 0.16 | 0.10 | — | 0.093 | 234.3 |

DCDA Dicyandiamide
TMP Trimethylolpropane
CL Caprolactam
DGA Diglycolamine

EXAMPLE 6

The resins from Example 1 to 5, were catalyzed with 0.2% by weight of hardener EC15 (Agrolinz Melamin Italia) for 20 minutes to a cloud point of 100° C. Decorative paper and kraft paper, which functioned as core paper, were then impregnated. The decorative paper (95 g/m²) comprised a resin proportion of 55% by weight and 6% by weight of volatile constituents (based on the impregnated paper), and the core paper (80 g/m²) comprised a resin proportion of 47% by weight and also 6% by weight of volatile constituents (based on the impregnated paper) A layer of impregnated decorative paper and 5 layers of core paper were then pressed together under a pressure of 70 bar at 175° C. for 20 seconds.

The laminates thus obtained were investigated for their postforming properties and their resistance to boiling water. The results can be seen from Table 2.

TABLE 2

| | Postforming properties Diameter in mm (*) | Resistance to boiling water | |
|---|---|---|---|
| | | Bubble formation after 2 and 6 hours | Water absorption % 3S EN 438-2 |
| Example 1 | <3 | no bubbles | 10.6 |
| Example 2 | <3 | a few small bubbles | 12.1 |
| Example 3 | <3 | a few small bubbles | 10.6 |
| Example 4 | <3 | no bubbles | 9.4 |

TABLE 2-continued

| | Postforming properties Diameter in mm (*) | Resistance to boiling water | |
|---|---|---|---|
| | | Bubble formation after 2 and 6 hours | Water absorption % 3S EN 438-2 |
| Example 5 | <3 | a few small bubbles | 13.1 |

(*) Smallest diameter around which the laminate specimen (145 × 35 mm) heated to 160° C. can be bent around a metal cylinder by 90° without tearing.

What is claimed is:

1. A modified melamine-formaldhyde resin which comprises a condensate of formaldehyde, melamine, urea and modifying agent comprising a) a combination of 5 to 25% by weight, based on the melamine, of dicyandiamide and 8 to 30% by weight, based on the melamine, of polyalcohol of the formula

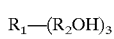   Ia or

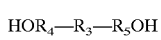   Ib in which, in the formula Ia, R₁ is a radical of the formula

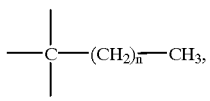

where n is 0 to 3, IIa
or a radical of the formula

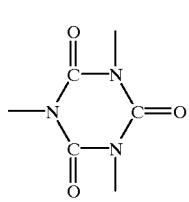   IIb and R₂ is a linear or branched (C₁ to C₄)alkylene radical and, in the formula Ib, R₃ is a cycloalkylene radical having 6 C atoms or R₃, like R₄ and R₅ is a linear or branched (C₁ to C₆)alkylene radical, which can optionally be substituted by a further hydroxyl group, where R₃, R₄ and R₅ can be identical or different and/or b) 1.5 to 20% by weight of amines of the formulae

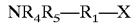   IIIa and/or

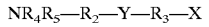   IIIb in which R₁ and R₃ can be identical or different and, depending on the meaning of X, are a linear or branched or cyclic C₁ to C₁₂-alkyl or alkylene radical and R₂ is a linear or branched or cyclic C₁ to C₁₂-alkylene radical, R₄ and R₅ can be identical or different and are H or a linear or branched $C_1$ to $C_{12}$-alkyl radical, and X can be hydrogen, OH or $NR_4R_5$ and Y can be —O— or —NH—, the molar ratio of melamine to formaldehyde being 1:1.2 to 1:5 and that of melamine to urea being 1:0.1 to 1:2.8.

2. The modified melamine-formaldehyde resin as claimed in claim 1, wherein the modifying agent comprises a combination of dicyandiamide and polyalcohol of the formula Ia or Ib.

3. The modified melamine-formaldehyde resin as claimed in claim 1, wherein the polyalcohol employed is trimethylolpropane, trimethylolethane, trishydroxyethyl isocyanurate, neopentylglycol, 1,4-dimethylolcyclohexane, 4-methyl-2,4-pentanediol, 1,6-hexanediol, 3-methyl-1,3,5-pentanetriol or 2,2,4-trimethyl-1,3-pentanediol or a mixture thereof.

4. The modified melamine-formaldehyde resin as claimed in claim 1, which comprises melamine and formaldehyde in a molar ratio of 1:1.4 to 1:2.8 and melamine and urea in a molar ratio of 1:0.15 to 1:1.

5. The modified melamine-formaldehyde resin as claimed in claim 1, which is present in liquid or spray-dried in powder form.

6. A melamine resin laminate, which comprises webs of paper or fabric impregnated with a modified melamine resin as claimed in claim 1.

7. A process for the production of a melamine resin laminate which comprises impregnating a web of paper or fabric with a modified melamine resin as claimed in claim 1, pressing the films obtained during the impregnation to give a laminate, optionally partly curing the laminate, and postforming and as a result completely curing it.

8. A method for the preparation of a modified melamine-formaldehyde resin, which comprises melamine and formaldehyde in a molar ratio of 1:1.2 to 1:5 and melamine and urea in a molar ratio of 1:0.1 to 1:2.8, comprising mixing formaldehyde, urea, melamine and a) 5 to 25% by weight, based on the melamine, of dicyandiamide and 8 to 30% by weight, based on the melamine, of polyalcohol of the formula

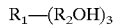  Ia or

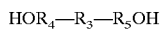  Ib in which, in the formula Ia, $R_1$ is a radical of the formula

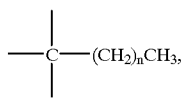  IIa where n is 0 to 3, or a radical of the formula

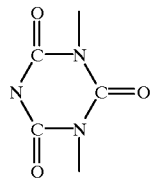  IIb and $R_2$ is a linear or branched ($C_1$ to $C_4$) alkylene radical and, in the formula Ib, $R_3$ is a cycloalkylene radical having 6 C atoms or $R_3$, like $R_4$ and $R_5$ is a linear or branched ($C_1$ to $C_6$) alkylene radical, which can optionally be substituted by a further hydroxyl group, where $R_3$, $R_4$ and $R_5$ can be identical or different or b) 1.5 to 20% by weight, based on the melamine, of amines of the formula

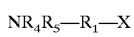  IIIa and/or

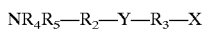  IIIb in which $R_1$ and $R_3$ can be identical or different and, depending on the meaning of X, are a linear or branched or cyclic $C_1$ to $C_{12}$-alkyl or alkylene radical and $R_2$ is a linear or branched or cyclic $C_1$ to $C_{12}$-alkylene radical, $R_4$ and $R_5$ can be identical or different and are H or a linear or branched $C_1$ to $C_{12}$-alkyl radical, and X can be hydrogen, OH or $NR_4R_5$, and Y can be —O— or —NH—, and subjecting the mixture to a condensation reaction.

9. A method for the preparation of a modified melamine-formaldehyde resin, which comprises melamine and formaldehyde in a molar ratio of 1:1.2 to 1:5 and melamine and urea in a molar ratio of 1:0.2 to 1:2.8, comprising mixing formaldehyde, urea, melamine and 40 to 60% by weight, based on the melamine, of amine of the formula

  IIIa and/or

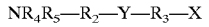  IIIb in which $R_1$ and $R_3$ can be identical or different and, depending on the meaning of X, are a linear or branched or cyclic $C_1$ to $C_{12}$-alkyl or alkylene radical and $R_2$ is a linear or branched or cyclic $C_1$ to $C_{12}$-alkylene radical, $R_4$ and $R_5$ can be identical or different and are H or a linear or branched $C_1$ to $C_{12}$-alkyl radical, and X can be hydrogen, OH or $NR_4R_5$, and Y can be —O— or —NH—, and subjecting the mixture to a condensation reaction.

10. A modified melamine-formaldehyde resin which comprises a condensate of formaldehyde, melamine, urea and modifying agent comprising 40 to 60% by weight, based on the melamine, of amines of the formulae $$NR_4R_5\text{—}R_1\text{—}X \qquad \text{IIIa}$$

and/or $$NR_4R_5\text{—}R_2\text{—}Y\text{—}R_3\text{—}X \qquad \text{IIIb}$$

in which $R_1$ and $R_3$ can be identical or different and, depending on the meaning of X, are a linear or branched or cyclic $C_1$ to $C_{12}$-alkyl or alkylene radical and $R_2$ is a linear or branched or cyclic $C_1$ to $C_{12}$-alkylene radical, $R_4$ and $R_5$ can be identical or different and are H or a linear or branched $C_1$ to $C_{12}$-alkyl radical, and X can be hydrogen, OH or $NR_4R_5$ and Y can be —O— or —NH—, the molar ratio of melamine to formaldehyde being 1:1.2 to 1:5 and that of melamine to urea being 1:0.1 to 1:2.8.

* * * * *